(12) United States Patent
Kucharski et al.

(10) Patent No.: US 10,730,225 B2
(45) Date of Patent: Aug. 4, 2020

(54) CRISSCROSS THERMOFORMING METHOD AND APPARATUS

(71) Applicant: Milsco Manufacturing Company, A Unit of Jason Incorporated, Milwaukee, WI (US)

(72) Inventors: John Kucharski, Mequon, WI (US); Kyle Donovan, Wauwatosa, WI (US)

(73) Assignee: Milsco, LLC, Milwaukee, WI (US)

( * ) Notice: Subject to any disclaimer, the term of this patent is extended or adjusted under 35 U.S.C. 154(b) by 311 days.

(21) Appl. No.: 15/942,606

(22) Filed: Apr. 2, 2018

(65) Prior Publication Data

US 2018/0290368 A1    Oct. 11, 2018

Related U.S. Application Data (60) Provisional application No. 62/480,350, filed on Mar. 31, 2017, provisional application No. 62/650,350, filed on Mar. 30, 2018.

(51) Int. Cl.
| | |
|---|---|
| *B29C 44/10* | (2006.01) |
| *B29C 51/08* | (2006.01) |
| *B29C 51/20* | (2006.01) |
| *B29C 51/04* | (2006.01) |
| *B29C 51/34* | (2006.01) |

(52) U.S. Cl.
CPC ............ *B29C 51/087* (2013.01); *B29C 51/04* (2013.01); *B29C 51/20* (2013.01); *B29C 51/34* (2013.01)

(58) Field of Classification Search
CPC ....... B29C 33/30; B29C 44/02; B29C 44/022; B29C 44/025
See application file for complete search history.

(56) References Cited

U.S. PATENT DOCUMENTS 4,106,884 A * 8/1978 Jegelka ................... B29C 44/10
264/334
4,233,006 A * 11/1980 Panas .................... B29C 44/428
264/51

(Continued)

*Primary Examiner* — Joseph S Del Sole
*Assistant Examiner* — Thu Khanh T Nguyen
(74) *Attorney, Agent, or Firm* — Boyle Fredrickson S.C.

(57) ABSTRACT

A crisscross thermoforming assist plug assembly having a pair of oppositely outwardly facing thermoforming assist plugs each carried by a respective one of a pair of thermoforming assist plug linkage arrangements, where at least one link of the linkage arrangement is used to extend one of the assist plugs in one direction crosses but does not contact in a side view or profile of the thermoforming assist plug assembly, and at least one link of the other linkage arrangement is used to extend the other one of the assist plugs in an opposite direction. The links of the linkage arrangement preferably pivot about a common pivot axis that preferably is an elongate pivot shaft extending transversely between elongate upper rails of a frame of the assembly. At least one of the links of the linkage arrangement is a drive link that extends or retracts one of the plugs that crosses a drive link that extends and/or retracts the other one of the plugs. The drive links preferably form a crisscross arrangement when actuated in a manner that substantially simultaneously extends the respective plugs into the mold cavity and/or substantially simultaneously retracts the respective plugs from the mold cavity.

20 Claims, 7 Drawing Sheets

(56) References Cited

U.S. PATENT DOCUMENTS

| | | | | |
|---|---|---|---|---|
| 5,743,982 A | * | 4/1998 | Marfilius | B29C 63/025 156/212 |
| 6,579,402 B1 | * | 6/2003 | Murar | B29C 66/80 156/273.3 |
| 9,346,199 B2 | * | 5/2016 | Kong | B29C 45/33 |
| 2005/0175726 A1 | * | 8/2005 | Yang | B29C 44/083 425/170 |

* cited by examiner

CRISSCROSS THERMOFORMING METHOD AND APPARATUS

CROSS REFERENCE

Pursuant to 35 U.S.C. § 119(e), this application claims all benefits to and priority in U.S. Provisional Application Ser. No. 62/480,350, filed on Mar. 31, 2017, and U.S. Provisional Application Ser. No. 62/650,350, filed on Mar. 30, 2018, the entirety of each of which is hereby expressly incorporated by reference herein.

FIELD

The present invention is directed to a thermoforming method and apparatus, and more particularly to a thermoforming apparatus using a crisscross articulating thermoforming plug assembly and a method of thermoforming using such a crisscross articulating thermoforming plug assembly that is well suited for thermoforming seat cushions including foam-in-place seat cushions.

BACKGROUND

In the past, thermoforming certain articles, such as vehicle seat cushions and cushion covers, which required a deep undercut to be formed ended up causing excessive thinning of the cover. When this happens, the number of defective rejects can increase and become unacceptably high. Even worse, where such articles with excessive thinning caused during thermoforming are not found defective, these articles can prematurely wear out, fail or otherwise perform unacceptably.

In one prior art method of making a foam-in-place seat cushion with a thermoformed vinyl cover, a deep undercut formed in the foam mold used to first thermoform the cover in the mold before pouring foam into the three dimensionally contoured recessed cover producing a foam-in-place seat cushion. Unfortunately, as previously indicated, the deep undercut formed in the foam mold causes vinyl seat cover material to become thinner during application of vacuum and heat during thermoforming such that excessive thinning of the cover in the undercut region can occur. Since foam is poured into the seat cushion cavity formed by the thermoformed cushion cover while vacuum is applied to maintain the shape of the cover, it is very difficult if not virtually impossible to detect whether excessive thinning of the cover has occurred prior to pouring foam into the cavity to produce the foam-in-place cover.

Where excessive thinning of the cover has occurred during thermoforming, the excessively thinned portion of the cover is subjected to premature wear, tearing, and failure, all of which is undesirable. Even where excessive thinning is detected, it frequently only is detected at an inspection stage that occurs after the foam has been poured in place and cured thereby undesirably wasting time, money and resources.

What is needed is a method and apparatus for thermoforming such articles, including seat covers, in a manner that achieves the desired look that requires use of a mold with deep undercuts but which does not cause thinning of the thermoformed material in the region of the deep undercut.

SUMMARY

The present invention is directed to a crisscross thermoforming assist plug assembly that is carried by a vertically reciprocable carriage that moves downwardly toward a thermoforming mold indexing and dwelling over a three-dimensionally contoured cavity of the mold enabling a pair of thermoforming assist plugs to be extended oppositely outwardly into oppositely spaced apart undercuts of the mold cavity disposed on opposite sides or edges of the cavity using the crisscross thermoforming assist plug assembly to thermoform a blank of thermoformable material into a thermoformed article that substantially conforms to the three-dimensional contour of the mold cavity. Where used to thermoform such a blank into an outer cover for a foam-in-place article like a vehicle seat cushion, the thermoformed article is retained in the mold cavity defining an in situ foam mold cavity in which foam can be introduced and cured to produce a foam-in-place article that preferably is a foam-in-place seat cushion. When thermoforming is completed, the plugs are retracted from the mold cavity undercuts and the carriage is moved upwardly away from the mold until there is sufficient clearance or space over the mold cavity for foam-making material to be dispensed into the in situ foam mold cavity formed by the thermoformed article retained in the mold cavity. Once cured, the foam articles can be removed readying the carriage and crisscross thermoforming assist plug assembly to perform another thermoforming molding cycle in accordance with the present invention.

In a preferred embodiment, thermoforming assist plug assembly has a frame that carries a pair of thermoforming linkage arrangements with one of the thermoforming linkage arrangements used to extend and retract one of the thermoforming assist plugs from one of the mold cavity undercuts and the other one of the thermoforming linkage arrangements used to extend and retract the other one of the thermoforming assist plugs from the other one of the mold cavity undercuts during thermoforming operation. Each thermoforming linkage arrangement has at least one swing arm link or linkage that pivots about the frame to guide a corresponding one of the thermoforming assist plugs toward a respective one of the mold cavity undercuts and has at least one trailing or follower link or linkage in operable cooperation with a rear of the corresponding one of the thermoforming assist plugs that preferably is or includes a drive linkage used to extend and/or retract the corresponding one of the plugs from the respective one of the mold cavity undercuts during thermoforming use and operation.

At least one of the links or linkages of one of the thermoforming linkage arrangements crosses, e.g., crisscrosses, in a side elevation view of the thermoforming assist plug assembly at least one of the links or linkages of the other one of the thermoforming linkage arrangements of the thermoforming assist plug assembly during extension and/or retraction of the assist plugs forming a crisscross articulating thermoforming assist plug assembly of the present invention. Such crisscross articulating links or linkages of the respective thermoforming linkage arrangements advantageously enable the assist plugs to be substantially simultaneously outwardly extended into the mold cavity and received in corresponding undercuts formed in opposite sides of the cavity in thermoforming the blank into a three-dimensionally contoured seat cushion cover used to produce a foam-in-place seat cushion but also enables both assist plugs to be substantially retracted from the corresponding undercuts into a relatively compact folded condition when thermoforming is done that can be quickly and easily withdrawn from the mold cavity to expedite pouring foaming material into the in-situ foam-in-place mold cavity formed by the three-dimensionally contoured seat cushion cover retained in the mold cavity. Such crisscross articulating linkage arrangements also advantageously enable insertion of the assist plugs at a relatively small acute included angle relative to a taut, planar, fixture blank during thermoforming that controllably stretches the blank being urged by the assist plug and thermoforming vacuum applied within the mold cavity to more uniformly stretch the respective portions of the blank urged into corresponding undercuts by the assist plugs. Such a slower more controlled rate of stretching of those portions of the blanks being urged into the corresponding undercuts by the assist plugs advantageously produce a thermoformed seat cushion cover having a more uniform thickness throughout including in and along those portions of the seat cover forming the front and rear and/or sides of the cover and any foam-in-place cushion formed therefrom.

In a preferred embodiment, the swing arm link(s) or linkage(s) and the trailing or following link(s) or linkage(s) of each one of the thermoforming linkage arrangements are pivotally connected at one end to spaced apart generally parallel elongate rails of the frame and are connected at an opposite end to spaced apart portions of a corresponding one of the assist plugs. In such a preferred embodiment, the trailing or following link(s) or linkage(s) of one of the thermoforming linkage arrangements is disposed in a crisscross arrangement with or relative to the trailing or following link(s) or linkage(s) of the other one of the thermoforming linkage arrangements when the assist plugs are extended outwardly preferably in a fully extended position. In one such preferred embodiment where the trailing or following link(s) or linkage(s) include at least one drive link or drive linkage, the drive link or drive linkage of one of the thermoforming linkage arrangements is disposed in a crisscross arrangement with or relative to the drive link or drive linkage of the other one of the thermoforming linkage arrangements when the assist plugs are extended outwardly preferably in a fully extended position. In a preferred embodiment, each drive link or drive linkage of each one of the thermoforming linkage arrangements is or includes a fluid-powered drive that preferably is a pneumatic drive having a reciprocable drive piston rod that is extended to extend by pushing outwardly a corresponding one of the assist plugs toward the extended position and which is retracted to retract the corresponding assist plug when thermoforming is completed.

Various other features, advantages and objects of the present invention will be made apparent from the following detailed description and the drawings.

DRAWING DESCRIPTION

One or more preferred exemplary embodiments of the invention are illustrated in the accompanying drawings in which like reference numerals represent like parts throughout and in which.

Before explaining one or more embodiments of the invention in detail, it is to be understood that the invention is not limited in its application to the details of construction and the arrangement of the components set forth in the following description and illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION

Figure 1:
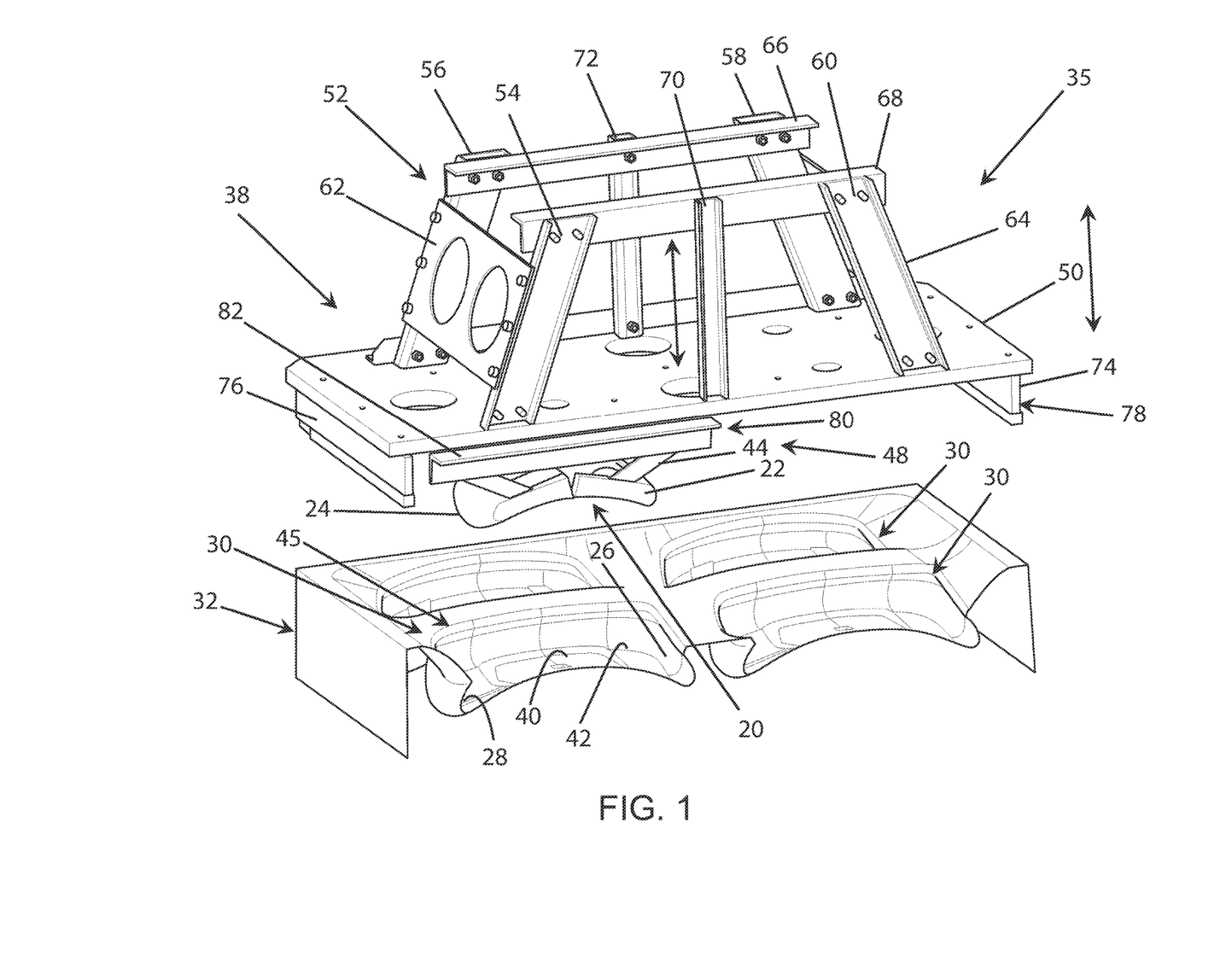
FIG. 1 is a side perspective view of an article thermoforming molding assembly having a thermoforming carriage reciprocable relative to a mold equipped base with the thermoforming carriage equipped with a thermoforming apparatus constructed in accordance with the present invention for each mold of the base.

FIGS. 1-7 illustrate a preferred embodiment of a thermoforming assist plug assembly 20 constructed in accordance with the present invention equipped with a pair of oppositely outwardly extensible thermoforming assist plugs 22, 24 that can be and preferably are substantially simultaneously extended outwardly into corresponding cushion side edge-shaping undercuts 26, 28 formed in opposite sides of a mold cavity 30 of a seat cushion forming mold 32. FIG. 1 illustrates a preferred seat cushion thermal forming manufacturing station 35 that includes a seat cushion mold arrangement 34 having a plurality of recessed seat cushion mold cavities 30 formed in a common mold base 36 above which is disposed a thermoforming assist plug assembly carriage 38 carrying a plurality of the thermoforming assist plug assemblies 20, only one assembly 20 of which is shown in FIG. 1. As discussed in more detail below, during use and operation, each thermoforming assist plug assembly 20 has a pair of thermoforming assist plugs 22, 24 that are extended oppositely outwardly relative to one another to bear against and urge respective portions of a seat cushion cover forming sheet or blank 40 of thermoformable material overlying the mold cavity 30 into corresponding seat cushion edge forming undercuts 26, 28 of the mold cavity 30 while a vacuum and/or heat are applied. The use of such oppositely outwardly extensible thermoforming assist plugs 22, 24 to substantially simultaneously urge respective portions of the thermoformable blank 40 into corresponding cushion mold cavity undercuts 26, 28 helps more uniformly stretch the blank 40 during application of heat and vacuum to the mold cavity 30 producing a three-dimensionally thermoformed seat cushion cover 42 having a more uniform cover thickness throughout.

As best shown in FIGS. 2-5, to enable the pair of oppositely outwardly extensible thermoforming assist plugs 22, 24 to be extended substantially simultaneously outwardly generally diagonally in opposite directions into corresponding opposite seat cushion mold cavity undercuts 26, 28, the thermoforming assist plug assembly 20 employs a crisscross thermoforming assist plug linkage assembly 44 and crisscross thermoforming assist plug linkage drive 46 constructed and arranged to do so relatively quickly during seat cushion cover thermoforming while advantageously also being able to relatively quickly substantially simultaneously retract both plugs 22, 24 from their respective mold cavity undercuts 26, 28 when three dimensional thermoforming of seat cushion cover 42 is done. Such quick and efficient operation of such a crisscross thermoforming assist plug assembly 20 of the present invention not only enables three dimensionally contoured seat cushion covers 42 to be more rapidly thermoformed, but then also more quickly retracts the assist plugs 22, 24 from the mold 32 and vertically pulls away from the mold 32 thereby more quickly enabling a foam or foaming liquid (not shown) to be dispensed into the cavity 30. Such a crisscross thermoforming assist plug assembly 20 and method of making a foam in place seat cushion with a thermoformed cushion cover 42 advantageously enables thermoforming of the cover 42 to be done more uniformly and quickly and thereby also enables application of an open or close foaming liquid or material, e.g. a urethane foam, to be applied in the thermoformed cover 42 while still held in the cavity 30 leading to more rapid foam in place thermoformed seat cushions made in accordance with the present invention.

With reference once again to FIG. 1, the thermoforming assist plug assembly carriage 38 has a mount 48 formed of a generally rectangular substantially rigid carriage base plate 50 that can be of metallic, e.g. steel or aluminum, or composite construction from which carriage suspension frame 52 upwardly extends that is mounted to a vertically reciprocable carriage drive (not shown) used to vertically reciprocate each thermoforming assist plug assembly up and down relative to the mold 32 during operation. Although exemplary in nature since other frame arrangements and layouts can be used, the carriage suspension frame 52 shown in FIG. 1 has upwardly extending generally diagonal corner carriage drive anchor beams 54, 56, 58, 60 disposed at the four corners of the frame 52 with the beams 54, 56, 58, 60 interconnected along front and back by generally horizontal strut plates 62, 64 and along each side by upper carriage drive mounting rails 66, 68. The frame 52 can and preferably does include a pair of spaced apart generally vertical intermediate support posts 70, 72 disposed on each side between the anchor beams that further help anchor each carriage drive mounting rail 66, 66 to the carriage base plate 50. At least a pair of front and back carriage stiffening frame rails 74, 76 preferably are mounted to the base plate 50 along the underside of the plate 50 which can include side rails (not shown) of similar construction forming a structurally rigidifying skirt 78 that helps stiffen and strengthen base plate 50 and carriage 38. The beams 54, 56, 58, 60, struts 62, 64, rails 66, 68, and posts 70, 72 of the frame 52 preferably are of metallic construction, e.g. made of steel or aluminum, but can be made of other suitable materials including plastics, composites and the like held together by structural bolts, structural cap screws, other types of structural connectors and the like, as known in the industry.

Figure 2:
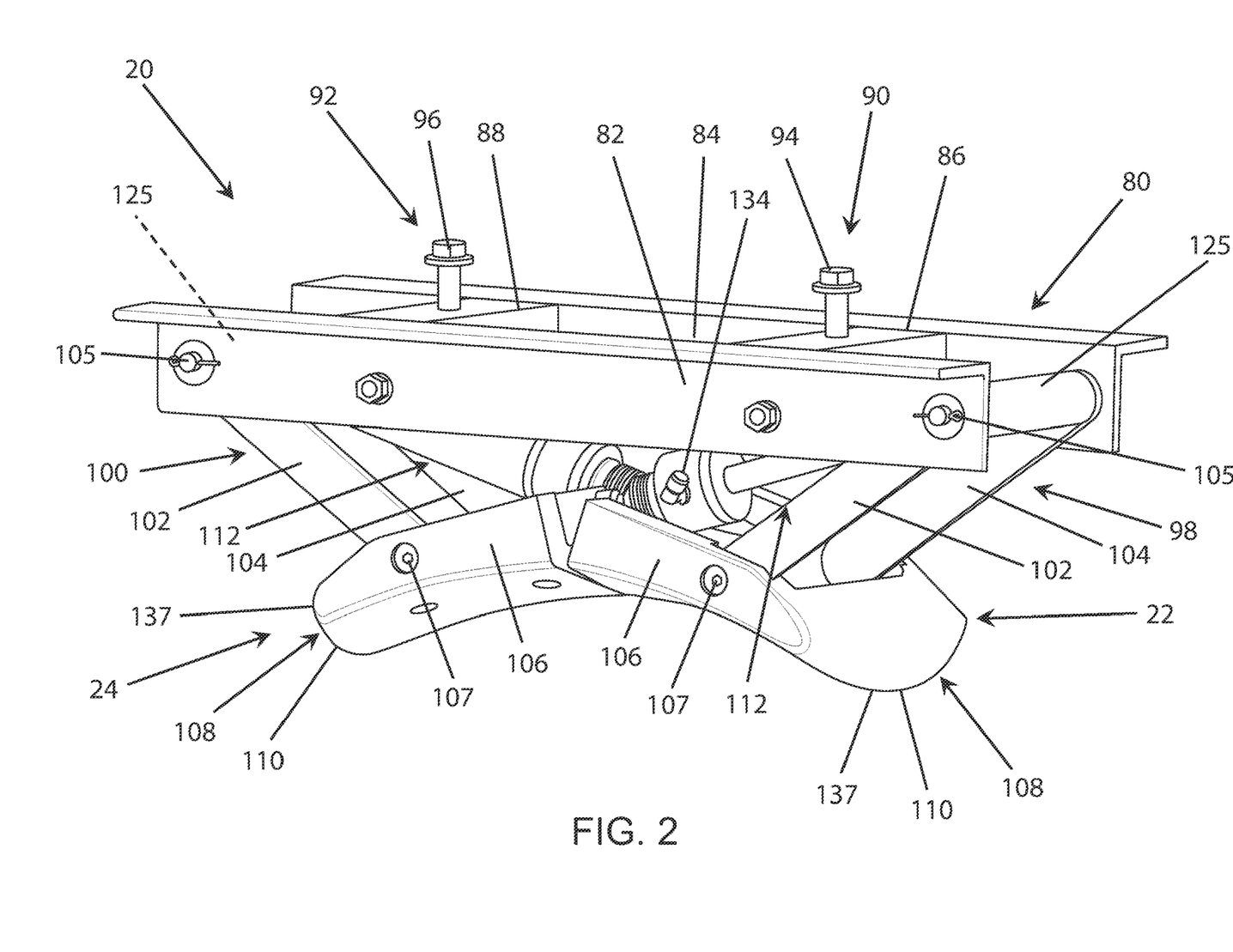
FIG. 2 is a perspective front side view of one side of a thermoforming assist plug assembly of the present invention having a frame from which a plurality of oppositely articulating thermoforming assist plugs are outwardly extendable therefrom with the thermoforming assist plugs disposed in a fully retracted position.
Figure 3:
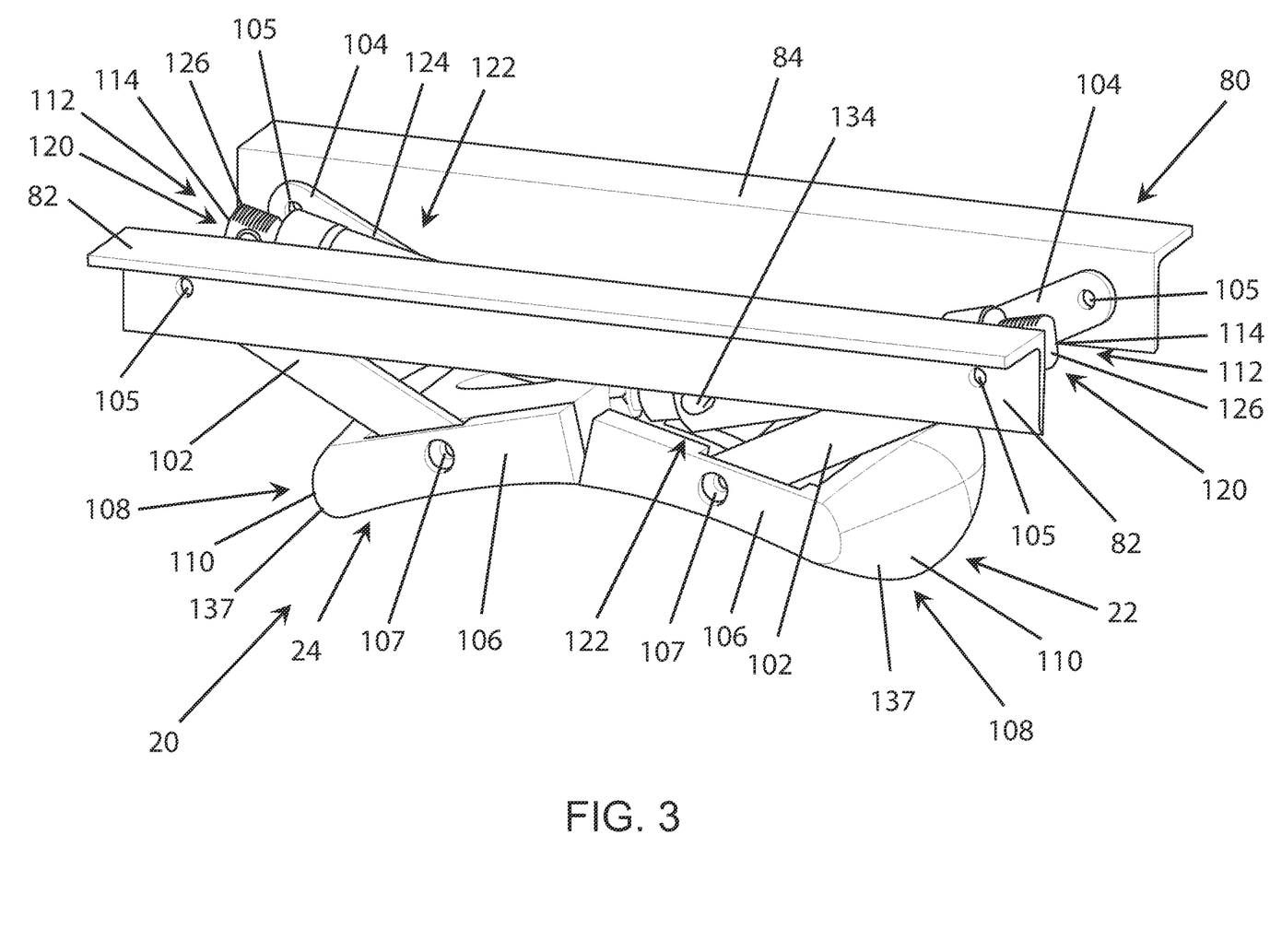
FIG. 3 is a perspective top side view of one side of the thermoforming assist plug also with the thermoforming assist plugs also disposed in a fully retracted position.
Figure 4:
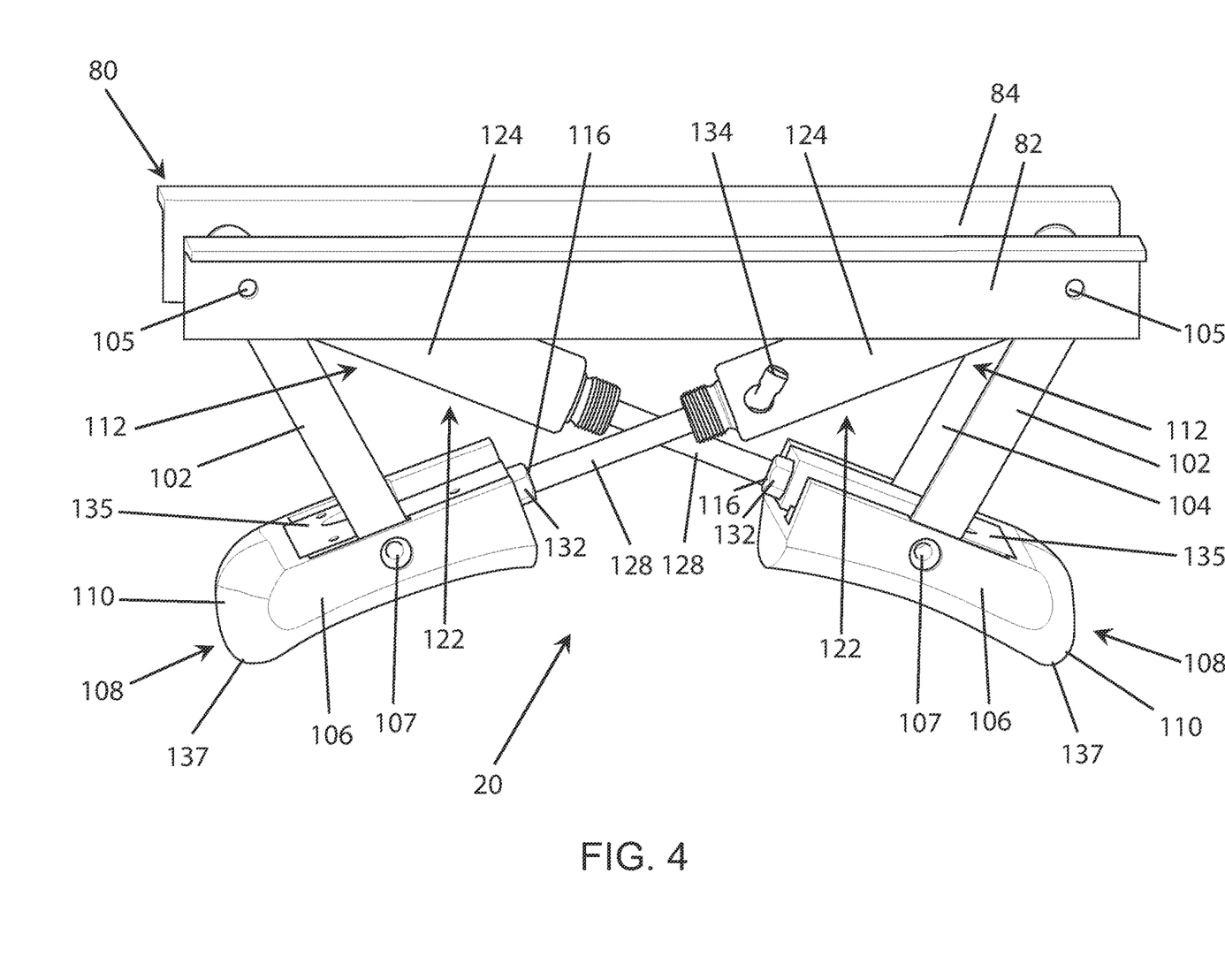
FIG. 4 is a side elevational perspective view of the thermoforming assist plug assembly with the thermoforming assist plugs disposed in an extended position depicting a crisscross or generally X-shaped configuration thereof.
Figure 5:
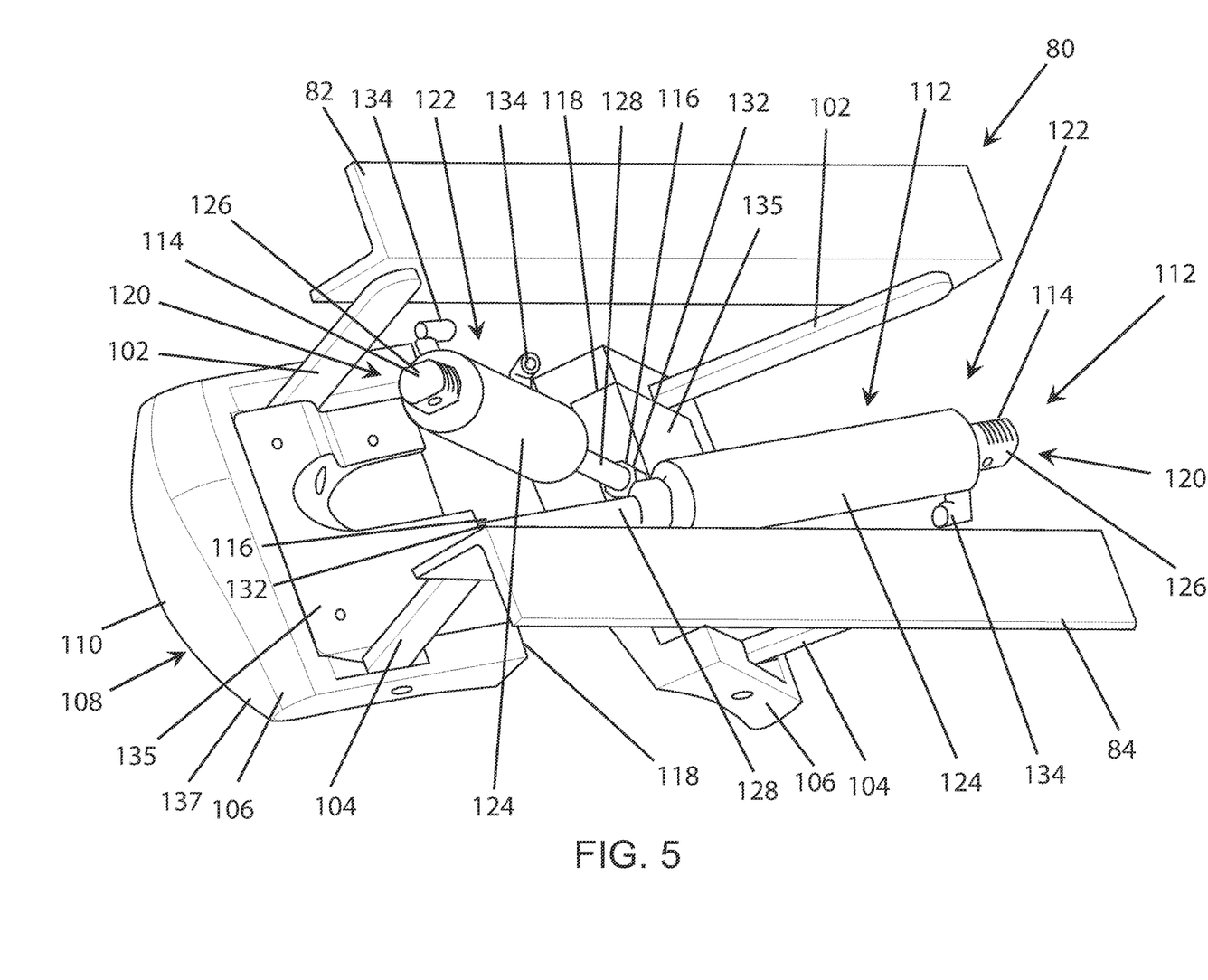
FIG. 5 is a top rear side perspective view of the thermoforming assist plug assembly with the linkage pivot shafts removed for clarity and depicting the thermoforming assist plugs disposed in a fully extended position.

As shown in FIGS. 2-5, thermoforming assist plug assembly 20 has a frame 80 along its top formed of a pair of elongate generally longitudinally extending frame rails 82, 84 spaced apart by a pair of fore and aft transverse struts 86, 88 interconnecting the frame rails 82, 84 and preferably also providing mounting points for 90, 92 attachment to the mount 48 formed of, by or in the underside of the base plate 50 of the carriage 38 in the manner depicted in FIG. 1. As best depicted by FIGS. 2 and 3, the thermoforming assist plug assembly frame 80 can be mounted to the underside of the base plate 50 of the carriage 38 by at least a plurality of structural bolts or cap screws 94, 96 with at least one such bolt or screw used to mount each one of the struts 86, 88 to the carriage base plate 50. If desired, one or more structural hanger rods, structural hanger rod clamps, I-beam clamps, and/or clips can be used instead of or in addition to bolts or screws 94, 96 to attach the struts 86, 88 of the thermoforming assist plug assembly frame 80 to the base plate 50 of the frame 52 of the thermoforming assist plug assembly carriage 38. If desired, one or more structural bolts, structural cap screws, structural hanger rods, structural hanger rod clamps, I-beam clamps, and/or hanger clips can also be used to attach the frame rails 82, 84 to the mounting plate 50 of the carriage 38 instead of and/or in addition to any of the aforementioned structural bolts, structural cap screws, structural hanger rods, structural hanger rod clamps, I-beam clamps, and/or hanger clips that can be used to attach the struts 86, 88 to the plate 50 of the carriage 38.

With continued reference to FIGS. 2-5, the crisscross thermoforming assist plug linkage assembly 44 is formed of a pair of assist plug linkage arrangements 98, 100 with each linkage arrangement 98, 100 including a pair of transversely spaced apart assist plug swingout guide links 102, 104 each attached by a pivot 105 at one end to a respective frame rail 82, 84 and attached by a pivot 107 at an opposite end to part of the body 106 of a corresponding assist plug 22, 24 rearwardly of a rounded thermoforming contouring nose 108 formed at a free end 110 of the plug 22, 24 that seats in a respective undercut 26, 28 of mold cavity 30 when the plugs 22, 24 are fully extended during thermoforming. During extension of the thermoforming plugs 22, 24, each pair of swingout guide links 102, 104 rotate about pivot 105 downwardly away from the frame rails 82, 84 until the plugs 22, 24 are fully extended. During extension of each thermoforming plug 22, 24 into its respective undercut 26 or 28 of mold cavity 30 during thermoforming, the rounded plug nose 108 of the plug 22, 24 urges the blank 40 into a corresponding undercut 26, 28 with the plug nose 108 having a laterally and/or transversely curved outer contour shape that is substantially the same as and complementary to that of the undercut 26, 28 in which the plug 22, 24 is removably received. Extension of the thermoforming plugs 22, 24 against respective spaced apart portions of the blank 40 helps urge, including by stretching, the blank 40 so the portion of the blank 40 engaged by plug 22, 24 is urged by its contacting plug nose 108 into respective undercuts 26, 28 of mold cavity 30 helping three-dimensionally form respective front and/or back or opposite side edges of a seat cushion cover 42. Doing so produces a seat cushion cover 42 having desirably rounded cushion sides shaped by the plugs 22, 24 during thermoforming that advantageously has a more uniform cover thickness in the regions shaped by the plugs 22, 24 during thermoforming.

Each one of the assist plug linkage arrangements 98, 100 further includes a rearwardly disposed trailing link 112 having a rear end 114 pivotally coupled to the frame rails 82, 84 and a front end 116 disposed in operable cooperation with a rear portion of the body 106 of the corresponding assist plug 22, 24 that also rotates downwardly away from frame rails 82, 84 during assist plug extension. The rear end 114 of each trailing link 112 preferably shares the same pivot axis as the swingout links 102, 104 of its respective assist plug linkage arrangement 98, 100 and the front end 116 of each trailing link 112 is fixed to a rear end 118 of the corresponding plug 22, 24 displaced by movement of links 102, 104 and 112 of respective linkage arrangement 98, 100 during assist plug extension and retraction.

Such a preferred crisscross thermoforming assist plug linkage assembly 44 of the present invention equipped with a pair of such linkage arrangements 98, 100 advantageously enable the front and rear sides or opposite sides of a seat cushion cover 42 of a foam-in-place seat cushion of the present invention to be substantially simultaneously thermoformed. In such a preferred crisscross thermoforming assist plug linkage assembly 44, the trailing links 112 of both linkage arrangements 98, 100 crisscross one another forming an X-shaped or crisscross configuration when the plugs 22, 24 are extended in the manner depicted in FIG. 4.

Each trailing link 112 preferably also is a drive linkage 120 having a thermoforming assist plug displacement drive 122 controllably actuated during operation to extend respective assist plug 22, 24 into corresponding undercut 26, 28 of mold cavity 30 during thermoforming and thereafter actuated, e.g., de-actuated, to retract respective assist plug 22, 24 from corresponding undercut 26, 28 of mold cavity 30 when thermoforming is completed. Each drive 122 has a drive cylinder 124 pivotally coupled via a mounting yoke 126 at its rear 114 to a pivot shaft 125 extending transversely side-to-side between the frame rails 82, 84. Each drive 122 also has an elongate reciprocable drive piston rod 128 extending outwardly from the cylinder 124 that is disposed in operable cooperation with the corresponding plug 22, 24 such that the corresponding plug 22, 24 moves substantially in unison with movement of the piston rod 128. In a preferred embodiment, the free end of the reciprocable piston rod 128 of the drive 122 is operatively connected to the rear 118 of corresponding plug 22, 24 preferably by being fixed thereto by a coupling 132 which can be threaded or the like such that the corresponding plug 22, 24 fixed to the drive piston rod end is displaced substantially in with movement of the drive piston rod 128 during operation. Coupling 132 can be mounted to a rear portion of a housing 135 of each plug 22, 24.

Each thermoforming assist plug displacement drive 122 preferably is a fluid powered drive 122 having a fluid coupling 134 that connects to a hose or tube (not shown) leading to a fluid power source. While each drive 122 can be a hydraulic drive, each drive 122 preferably is a pneumatic drive 122 powered by a source of pressurized or compressed air delivered via a hose or tube connected to coupling 134. Using pneumatically powered drives 122 advantageously speeds extension and retraction of the plugs 22, 24 during thermoforming. If desired, each drive 122 can be an electrically powered motor, such as a gear motor, ball screw, or another type of electrically powered prime mover.

Where each drive 122 is a pneumatic drive 122, the coupling 132 connected to the housing 135 of corresponding plug 22, 24 inflates a bladder 137 of the plug 22, 24 that more uniformly urges a flexible and resilient portion of the nose 108 outwardly against a contacting part of the blank 40 in the respective undercut 26, 28 of cavity 30. Use of such a pass through pneumatic coupling 132 connecting pneumatic drive 122 to bladder housing 135 of corresponding plug 22, 24 enables compressed or pressurized air to be used to not only extend the plug 22, 24 against blank 40 to help form it into a seat cushion cover 42 but also to inflate outer bladder 137 of the plug 22, 24 urging the blank 22, 24 more uniformly against respective undercut 26, 28.

Figure 6:
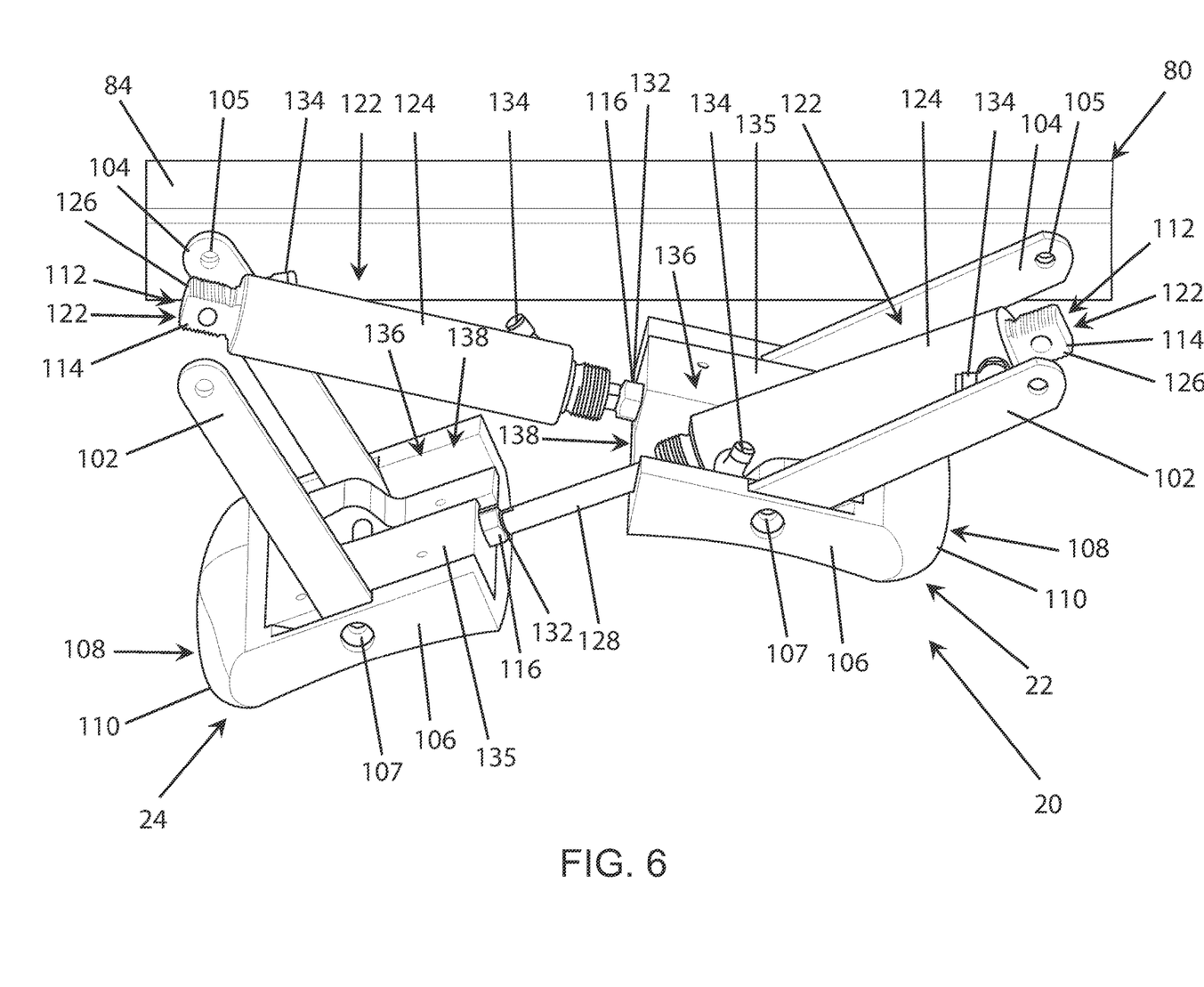
FIG. 6 is a top side perspective view of the thermoforming assist plug assembly with the front and rear linkage pivot shafts and one of the frame rails of the carrier removed for clarity depicting one of the thermoforming assist plugs disposed in the fully extended position and the other one of the thermoforming assist plugs disposed in the fully retracted position.
Figure 7:
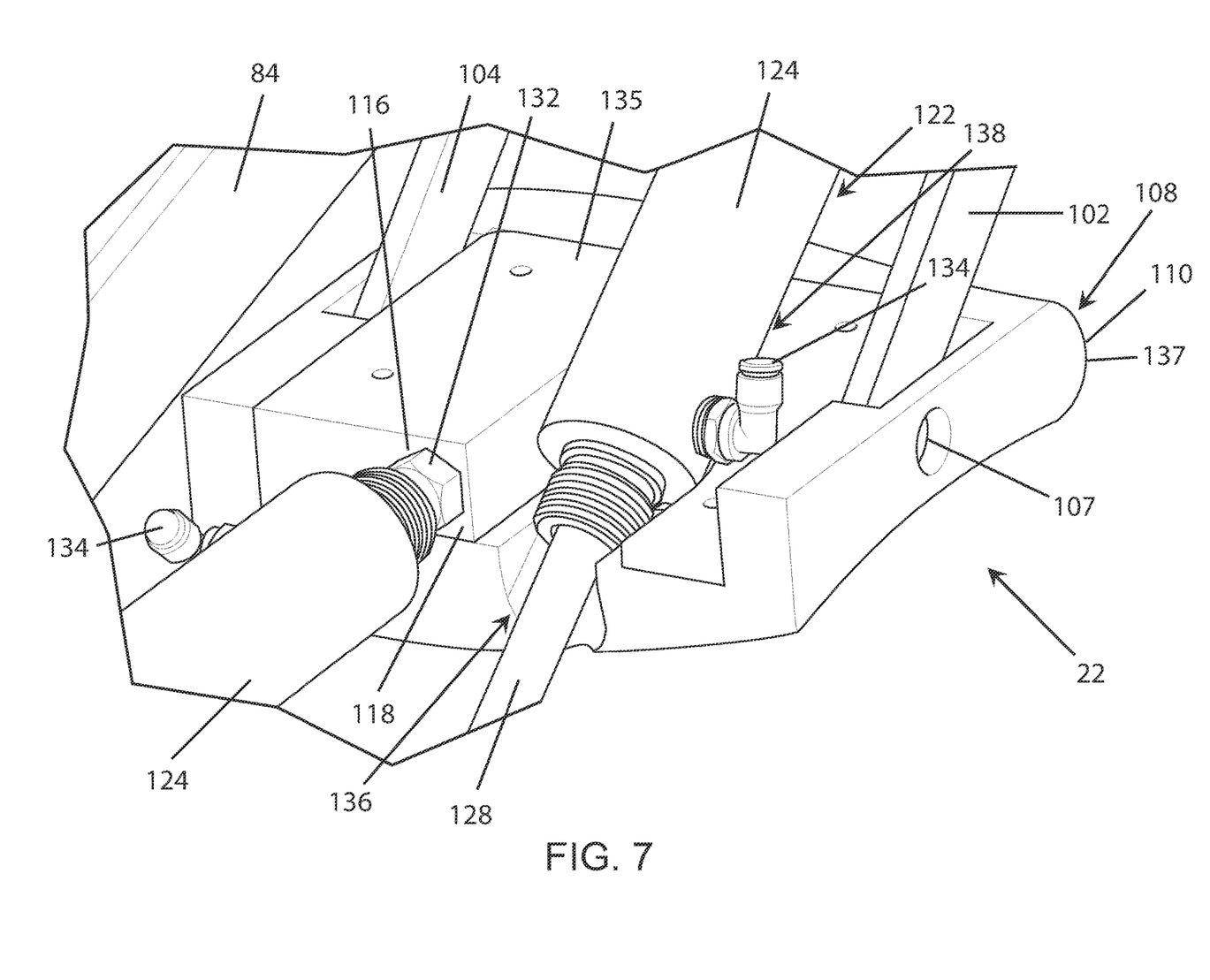
FIG. 7 is a fragmentary perspective side view of one of the thermoforming assist plugs when the thermoforming assist plug assembly is disposed in the fully retracted position.

With additional reference to FIGS. 6 and 7, the body 106 of each thermoforming assist plug 22, 24 preferably has a recessed drive linkage clearance channel 136 formed therein in which part of the drive linkage 120 is disposed when the plugs 22, 24 are substantially completely retracted into the substantially folded position depicted in FIGS. 2 and 3. In a preferred embodiment, the drive linkage clearance channel 136 of each one of the plugs 22, 24 has an arcuate cross-section or cross-sectional contour defining a drive cradle 138 in which seats part of the cylinder 124 of the drive 122 of the linkage arrangement 98, 100 that displaces the other one of the plugs 22, 24 when disposed in the retracted position. Where a preferred embodiment of the thermoforming assist plug assembly 20 of the present invention is configured to independently, e.g., sequentially, extend one of the assist plugs 22, 24 relative to and/or before the other one of the assist plugs 22, 24, at least a portion of the cylinder 124 of the drive 122 of one of the linkage arrangements 98, 100 seats in the cradle 138 formed in the plug 22, 24 of the other one of the linkage arrangements 98, 100 such as best depicted in FIG. 7. If desired, each plug 22, 24 can have a drive rod clearance seating channel 140 in communication and preferably in line with the drive cradle 138 and which forms a necked down or narrowed part of the drive linkage clearance channel 136.

With reference once again to FIG. 1, a blank 40 of thermoformable material that preferably is composed of vinyl or another suitable type of thermoformable material is fixtured taut over each mold cavity 30 prior to thermoforming. While the mold 32 over which the blank 40 can be heated to enable thermoforming of the blank 40, the blank 40 preferably is heated prior to fixturing the blank 40 over the cavity 30 of the mold 32. As is known in the thermoforming art, heating the blank 40 prior to and/or during application of vacuum to draw the blank 40 into the mold cavity 30 helps better conform the blank 40 to the three-dimensional contour of the cavity 30.

As each mold 32 has a recessed cavity 30 three-dimensionally contoured to form the heated or preheated nylon blank 40 into a three-dimensionally shaped outer seat cushion cover 42 whose recess after thermoforming produces a recessed foam-in-place seat cushion mold cavity 45. During thermoforming, a vacuum is applied to suck or otherwise draw the blank 40 into the cavity 30 drawing it against the three-dimensional contour of the cavity 30 causing the blank 40 to substantially conform to the three-dimensional contour of the cavity 30 thereby forming the three-dimensionally shaped seat cushion cover 42. Once thermoforming of the cover 42 is completed, an open or closed cell foam making material preferably in the form of a foaming liquid, preferably a urethane foaming liquid or the like, is poured into the in-situ seat cushion mold cavity 45 formed by the blank 40 thermoformed into cover 42 while a vacuum preferably is still applied to retain the three-dimensional shape of the cover 42.

To help facilitate thermoforming of the blank 40 into a seat cushion cover 42 having curved or rounded front and rear ends or edges, the cavity 30 has front and rear undercuts 26, 28 into which corresponding front and rear portions of the blank 40 are drawn during thermoforming. To facilitate thermoforming of the blank 40 into such a three-dimensionally shaped seat cover 42, a thermoforming assist plug assembly 20 constructed in accordance with the invention is operated to substantially simultaneously extend both plugs 22, 24 oppositely outwardly against respect opposite cushion edge forming portions of the blank 40 drawn at least partway into the mold cavity 30 by application of vacuum and into corresponding mold cavity undercuts 26, 28. In doing so, each plug 22, 24 advantageously helps more uniformly stretch the opposite cushion edge forming portions of the blank 40 as the plugs 22, 24 respectively urges them into corresponding undercuts 26, 28 while vacuum is applied between the blank 40 and mold cavity 30.

When the blank 40 is fixtured in place over the cavity 30 of the mold 32, the thermoforming assist plug assembly 20 overlies the cavity 30 such as in the manner depicted in FIG. 1. Where part of a multiple thermoforming assist plug assembly thermal forming station 35 like that shown in FIG. 1, multiple thermoforming assist plug assemblies 20 are carried by carriage 38 which moves all of the thermoforming assist plug assemblies 20 substantially simultaneously downwardly toward the mold base 36 and each of its molds 32. The carriage 38 carrying multiple thermoforming assist plug assemblies is moved vertically downwardly toward the mold base 36 carrying a corresponding number of molds 32 each with a preferably substantially identically three-dimensionally mold cavity 30 until reaching a plug-extending thermoforming position adjacent the cavities 32. When reaching such a plug-extending thermoforming position adjacent the cavities 32 where the carriage 38 is disposed adjacent to or even abuts against a top or outer surface of the mold base 36 and/or a top or outer surface of the molds 30, the plugs 22, 24 of each thermoforming assist plug assembly 20 are extended outwardly substantially simultaneously from rails 82, 84 of the thermoforming assist plug assembly frame 80. The plugs 22, 24 are extended oppositely outwardly from one another by the crisscross drive linkage arrangement formed by the drives 122, preferably their respective drive piston rods 128, crisscrossing each other in the side elevation view depicted in FIG. 4 such that the drives 122, preferably drive piston rods 128, are arranged in an X-shape or X-configuration. Such a crisscross drive linkage 120 of the assist plug linkage arrangements 98, 100 of a thermoforming assist plug assembly 20 constructed in accordance with the present invention advantageously enables a pair of curved or rounded front and rear cushion sides or cushion edges to be substantially thermoformed in a seat cushion cover 42 of the present invention used as a foam-in-place cavity of an in-situ foam-in-place mold while in its thermoformed shape. Such a crisscross drive linkage 120 of the assist plug linkage arrangements 98, 100 of a thermoforming assist plug assembly 20 constructed in accordance with the present invention further advantageously enables the plugs 22, 24 to be thereafter retracted from the undercuts 26, 28 of the mold cavity 30 into a substantially folded condition as depicted in FIGS. 2 and 3 with the rear end of the plugs 22, 24 located adjacent one another and which can be disposed in abutment with one another.

Once the plugs 22, 24 are disposed in the fully retracted position disposing the thermoforming assist plug assembly 20 in the substantially completely folded condition shown in FIGS. 2 and 3 enabling the carriage 38 (FIG. 1) to be vertically retracted away from the mold base 36, the molds 32 and cavities 30. The carriage 38 and folded up thermoforming assist plug assembly 20 are retracted away from the mold base 36, molds 32 and cavities 30 until reaching an out of the way position that provides sufficient clearance or space therebetween to enable a foam or foaming material to be dispensed into the three-dimensionally shaped in situ mold cavity 45 formed by the thermoformed seat cushion cover 42 while still retained in mold cavity 30. Once the foam cures or hardens, a seat cushion (not shown) formed by the thermoformed seat cushion cover 42 structurally supported by the hardened or cured foam is removed from the mold cavity 30. Once the finished foam-in-place seat cushion is removed from the mold cavity 30, another blank 40 can be and preferably is fixtured over the cavity 30 readying the carriage 38 (FIG. 1) to be brought downwardly toward it to perform another thermoforming cycle.

Understandably, the present invention has been described above in terms of one or more preferred embodiments and methods. It is recognized that various alternatives and modifications may be made to these embodiments and methods that are within the scope of the present invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the appended claims directed to the invention.

It is claimed:

1. A thermoforming assist plug assembly comprised of a pair of thermoforming assist plugs mounted to a corresponding one of a pair of thermoforming assist plug linkage arrangements with each one of the pair of thermoforming assist plug linkage arrangements having a link or linkage that crisscrosses with the respective link or linkage of the other one of the pair of thermoforming assist plug linkage arrangements when the pair of thermoforming assist plugs are disposed in a fully extended position.

2. The thermoforming assist plug assembly of claim 1, wherein each one of the thermoforming assist plug linkage arrangements are comprised of at least one swing arm link attached at one end to a frame of the thermoforming assist plug assembly and an opposite end to one of the thermoform assist plugs that swings outwardly relative to the frame away from the frame guiding a free end of the one of the thermoform assist plugs into seating in one of a pair of oppositely spaced apart undercuts formed in a mold cavity in thermoforming a blank and at least one trailing link disposed rearwardly of the swing arm link attached at one end to the thermoforming assist plug assembly frame and at the other end to the one of the thermoform assist plugs.

3. The thermoforming assist plug assembly of claim 2, wherein the at least one swing arm link and the at least one trailing link are pivotally attached by a common pivot to the thermoforming assist plug assembly frame.

4. The thermoforming assist plug assembly of claim 3, wherein the at least one swing arm link and the at least one trailing link are pivotally attached to a pivot extending transversely to the at least one swing arm link and the at least one trailing link.

5. The thermoforming assist plug assembly of claim 4, wherein the thermoforming assist plug assembly frame is comprised of a pair of spaced apart, generally parallel and elongate frame rails extending in a direction generally parallel to the direction of motion of the at least one swing arm link and the at least one trailing link, and wherein pivot extends transversely between the frame rails.

6. The thermoforming assist plug assembly of claim 2, wherein one of the at least one swing arm link and the at least one trailing link comprises a drive link that extends the thermoforming assist plugs outwardly to an extended thermoforming position where the plugs seat in a corresponding undercut formed in the mold cavity during thermoforming a thermoformable blank of material.

7. The thermoforming assist plug assembly of claim 6, wherein each drive link comprises a prime mover that extends the corresponding plug linked therewith between an extended plug thermoforming assist position in which the plug is removably seated in the mold cavity undercut and a substantially full retracted position where the plug is withdrawn from the undercut and mold cavity.

8. The thermoforming assist plug assembly of claim 7, wherein each drive link comprises a fluid powered drive.

9. The thermoforming assist plug assembly of claim 8, wherein each drive link comprises a pneumatic drive.

10. The thermoforming assist plug assembly of claim 6, wherein the drive link of one of the thermoforming assist plug linkage arrangements crisscrosses with the drive link of the other one of the thermoforming assist plug linkage arrangements when the thermoforming assist plugs are urged thereby to a fully extended position.

11. The thermoforming assist plug assembly of claim 10 wherein each one of the thermoform assist plugs have a clearance recess in which the drive link of the drive that drives the other one of the thermoform assist plugs is received when the drive or drive link is disposed in one of the assist plug extended or retracted positions.

12. A thermoforming assist plug assembly comprised of a pair of thermoforming assist plug linkage arrangements carried by a frame that are each configured to removably extend a corresponding one of a pair of thermoforming assist plugs into a respective undercut of a mold cavity wherein the thermoforming assist plug linkage arrangements are configured to oppositely outwardly extend the pair of thermoforming assist plugs into respective undercuts formed in opposite sides or ends of the mold cavity during thermoforming and thereafter retract the thermoforming assist plugs from the undercuts in the cavities when thermoforming of a thermoformable blank of material into a three dimensionally contoured seat cushion cover.

13. The thermoforming assist plug assembly of claim 12, wherein each one of the thermoforming assist plug linkage arrangements has a drive linkage comprised of a first thermoforming plug assist drive that orients in a crisscross arrangement relative to the drive linkage of the other one of the thermoforming assist plug linkage arrangements that is comprised of a second thermoforming plug assist drive when the first and second thermoform assist plugs are disposed in an extended position.

14. The thermoforming assist plug assembly of claim 13, wherein each one of the thermoforming assist plug linkage arrangements has a drive linkage comprised of a first thermoforming plug assist drive that orients in a crisscross arrangement relative to the drive linkage of the other one of the thermoforming assist plug linkage arrangements that is comprised of a second thermoforming plug assist drive when the first and second thermoform assist plugs are disposed in a fully extended position.

15. The thermoforming assist plug assembly of claim 12, wherein each one of the thermoforming assist plug linkage arrangements has at least one swing away thermoform assist plug guide link pivotally attached at one end to the frame and at an opposite end to a corresponding one of the thermoform assist plugs, and least one drive link pivotally attached at one end to the frame and at an opposite end to the corresponding one of the thermoform assist plugs.

16. The thermoforming assist plug assembly of claim 15, wherein the at least one swing away link and the at least one drive link are pivotally attached along a common pivot axis to the frame.

17. The thermoforming assist plug assembly of claim 16, wherein each one of the thermoform assist plugs have a clearance recess formed therein for receiving a portion of at least one of the swing away link and at least one drive link that displaces the other one of the thermoform assist plugs toward one of an extended position and a retracted position.

18. The thermoforming assist plug assembly of claim 16, wherein the at least one drive link that displaces one of thermoform assist plugs defines a crisscross arrangement with the at least one drive link that displaces the other one of the thermoform assist plugs when the at least one drive links of both thermoforming assist plug linkage arrangements displace the respective thermoform assist plugs toward the extended position.

19. The thermoforming assist plug assembly of claim 16, wherein the at least one drive link that displaces one of thermoform assist plugs defines a crisscross arrangement with the at least one drive link that displaces the other one of the thermoform assist plugs when the at least one drive links of both thermoforming assist plug linkage arrangements displace the respective thermoform assist plugs toward the fully extended position.

20. The thermoforming assist plug assembly of claim 16, wherein the at least one drive link that displaces one of thermoform assist plugs defines a crisscross arrangement with the at least one drive link that displaces the other one of the thermoform assist plugs when the at least one drive links of both thermoforming assist plug linkage arrangements fully extends the respective thermoform assist plugs.

\* \* \* \* \*